United States Patent Office 3,259,614
Patented July 5, 1966

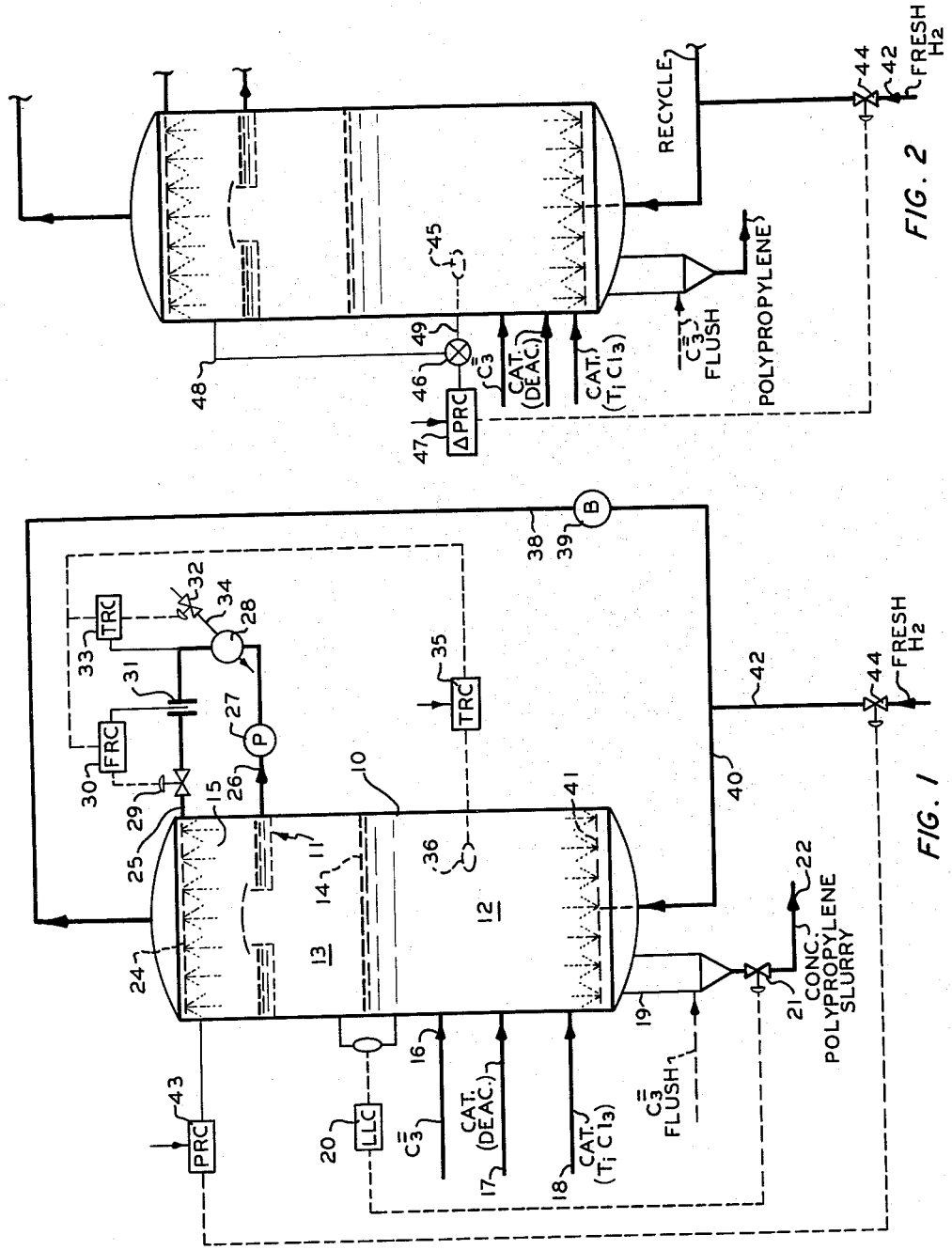

3,259,614
POLYMERIZATION PROCESS AND CONTROL SYSTEM
Lyle W. Pollock, Bartlesville, Okla., assignor to Phillips Petroleum Company, a corporation of Delaware
Filed Aug. 7, 1961, Ser. No. 129,674
7 Claims. (Cl. 260—93.7)

This invention relates to the polymerization of olefins, especially propylene, to solid polymers. In one aspect this invention relates to an improved process for polymerizing propylene in the presence of a controlled amount of hydrogen. In another aspect this invention relates to a novel system for controlling hydrogen concentration in a polymerization process. In another of its aspects, the invention relates to an improved method for autorefrigerating a polymerization process to remove heat of reaction.

The polymerization of olefins, particularly propylene, to high molecular weight resins is well known and it is recognized that highly crystalline polymers, frequently designated as isotactic polypropylene, are preferred for most practical applications. A well known procedure for the preparation of polymers of high isotactic content involves polymerization of propylene in the presence of a catalyst system comprising an organometal, preferably an alkylaluminum compound, and a titanium halide such as titanium trichloride. Recently, it has been found that catalyst productivity, melt index, and flexural modulus values of the polypropylene product can be controlled by carrying out the polymerization in the presence of a small amount of hydrogen. The effective control of the process variables such as time, temperature, pressure and concentraiton is of utmost importance in polymerization processes since not only yield, but also the physical properties of the final product are affected thereby. A satisfactory control of the interrelated process variables has been a serious problem in such catalyzed reactions.

According to the invention, I provide apparatus and process for (1) autorefrigerating a polymerization zone to remove heat of reaction and (2) automatically controlling heat removal rate and hydrogen concentration in such a polymerization.

Accordingly, an object of this invention is to provide an improved process for producing solid propylene polymer.

Another object is to provide an economical system for autorefrigerating a polymerization zone having a vapor phase and a liquid phase.

A further object is to provide a control system for controlling the hydrogen concentration in a polymreization zone.

A further object of this invention is to provide a novel reactor for polymerization.

Other objects, aspects, as well as the several advantages of the invention will become apparent to one skilled in the art upon consideration of the accompanying disclosure, the drawings, and the appended claims.

Broadly speaking, the present invention resides in an improvement for autorefrigerating a polymerization reactor having a vapor phase and a liquid phase and for controlling the rate at which hydrogen is introduced into such a polymerization reaction zone and the rate at which heat of reaction is removed from the polymerization. I have now found that the control of hydrogen addition and/or recirculation responsive to reactor pressure or differential vapor pressure from a reference liquid of known concentration provides an improvement in controlling a propylene polymerization process. Further, I have found that substantially all of the reaction heat can be removed from a polymerization process having a vapor and liquid phase by subcooling a liquid reflux and spraying it back against vapor rising from the reaction zone. Still further, I have found that the rate of reaction heat removal can be controlled responsive to the temperature of the liquid phase in the reaction zone.

In accordance with one embodiment of my invention, I provide a process for polymerizing propylene to solid polymer by contacting an organometallic catalyst with a body of boiling liquid propylene containing hydrogen in a reaction zone having a liquid phase and a vapor phase which comprises autorefrigerating said zone by subcooling a liquid propylene reflux and contacting it with rising vapor in said vapor phase to condense propylene, controlling the rate at which heat of reaction is removed responsive to temperature changes of the liquid phase, and controlling hydrogen addition to said liquid phase responsive to the hydrogen concentration in the polymerization zone.

The apparatus of my invention is a reactor and control system which comprises in combination, an elongated substantially vertical vessel having a lower liquid reaction section and an upper vapor phase and reflux section, means for introducing catalyst, hydrogen and monomer into said reaction section, a donut tray provided with a capped chimney positioned above the liquid level in the reaction section of said vessel, vapor-liquid contacting means positioned above said tray in said reflux section, means for circulating condensed liquid withdrawn from said tray through a cooler and then back to said contacting means, means for withdrawing polymer solids from a lower portion of said reaction section, means for measuring the temperature of the liquid phase in said reaction section, means for controlling the rate at which said cooler removes heat of reaction responsive to temperature changes sensed by said temperature measuring means, means for measuring the hydrogen concentration in said vessel, and means for controlling the rate at which hydrogen is fed to said reaction section responsive to said measured hydrogen concentration.

Although an inert liquid diluent is normally employed in propylene and other olefin polymerization processes, according to my invention the polymerization is preferably carried out with liquid propylene as the reaction medium. A vertical tower is normally employed as the reactor and a propylene vapor stream containing hydrogen is preferably introduced into the bottom of the tower thereby substantially eliminating the need for internal agitation by mechanical means. The reaction mixture is cooled by boiling the liquid propylene and the temperature of the process can be controlled by regulating the rate at which heat of reaction is removed by the autorefrigeration system. Also, propylene vapor containing hydrogen is preferably withdrawn from an upper portion of the vapor space in the reactor and, at least a portion thereof, is circulated to the bottom of the body of boiling propylene to agitate same and to redissolve gaseous hydrogen. Furthermore, propylene vapor is condensed in the reflux section of the reactor, removed from the reactor and subcooled, and then returned to the top of the reactor and contacted countercurrently with rising vapor in the reflux section to condense additional propylene vapor.

Although the invention is described as being primarily directed to the production of solid polyropylene, it should be realized by those skilled in the art that the invention is equally applicable to other olefin polymerizations carried out in the presence of hydrogen in a zone having a liquid and vapor phase. The term "propylene polymer" as used herein includes homo- and copolymers of propylene. Propylene can be copolymerized with minor amounts of other olefins such as ethylene, 1-butene, etc.

Under the polymerization conditions employed in my process, polypropylene is formed in the reactor in solid particulate form and is removed from the reactor by gravitational settling. A relatively quiescent zone is preferably maintained in communication with the lower portion of the reaction zone so that polymer particles can settle therein and accumulate for removal from the reactor in a high solids concentration. Dialkylaluminum chloride catalyst component and soluble polymer can be removed from the effluent polymer by countercurrent propylene washing in the quiescent zone, for example. The spent catalyst components can be removed from the effluent polymer, after removal of uneracted propylene, by washing with a suitable solvent such as isopropyl alcohol. If desired, the polypropylene product can be further extracted with a suitable solvent such as normal heptane for removal of an atactic polymer fraction. Depending upon the polymerization conditions employed more or less such atactic polymer is formed and it may be desirable to effect such a removal of amorphous polymer in order to improve the flexural modulus of the finished product.

As indicated above, the present polymerization process is carried out in the presence of elemental hydrogen. When so operating, hydrogen is added in an amount sufficient to provide from 0.03 to 0.40 mol percent hydrogen, preferably 0.1 to 0.3 mol percent, in the liquid propylene phase of the polymerization zone. By this means productivity of the catalyst, melt index and flexural modulus values of the polypropylene product are increased. Carrying out the polymerization in the presence of hydrogen as set forth above is described and claimed in copending application having Serial No. 102,954, filed April 14, 1961, now abandoned.

While a wide variety of organometallic systems can be employed for the polymerization of propylene to solid resin, I prefer to use a catalyst which includes the combination of an aluminum alkyl and a titanium halide, preferably a dialkylaluminum chloride or bromide in which the alkyl groups have from 1 to 12 carbon atoms each and titanium trichloride. The catalyst system most preferred is diethylaluminum chloride and a titanium trichloride complex (aluminum reduced $TiCl_4$). This catalyst can be used very successfully to polymerize propylene to high molecular weight resin at temperatures and pressures which permit liquid propylene to be employed as the reaction medium.

The amount of catalyst employed in the polymerization of propylene when utilizing the above-described catalyst components can vary over a rather wide range. The amount of dialkylaluminum halide used should be at least $1.0 \times 10^{-4}$ gram per gram of monomer and can be as much as $25 \times 10^{-4}$ grams per gram of monomer. The amount of titanium trichloride complex employed will generally be in the range between $1.5 \times 10^{-4}$ and $10 \times 10^{-4}$ grams per gram of monomer. The mol ratio of dialkylaluminum halide to titanium trichloride complex ordinarily ranges from 1.0:0.005 to 1.0:50.0, preferably 1.0:0.1 to 1.0:10.0.

The polymerization is ordinarily carried out at a temperature ranging from about 60 to about 160° F., preferably from 90 to 125° F. when hydrogen is employed in a mass polymerization system for propylene. However, for other systems higher or lower temperatures can be employed when desired. The pressure employed in the boiling polymerization zone is somewhat in excess of the vapor pressure of propylene at reactor temperature. The residence time for polymerization ordinarily ranges from 5 minutes to 20 hours or longer, preferably from 1 to 5 hours.

As mentioned above, the preferred polymerization according to the invention is conducted as a mass system wherein the propylene is in liquid phase, and the polymerization is carried out without the addition of more than small amounts of an inert diluent. As is well known, commercially produced propylene ordinarily contains minor amounts, for example up to 10 percent, of inert materials such as paraffinic hydrocarbons and it is intended that polymerization of these commercial propylene feeds are included within the scope of the invention. The term "small amounts of an inert diluent" is, therefore, to be taken to mean such amounts of inert diluent as are introduced into the reaction zone by way of inert paraffinic hydrocarbons in the propylene feed and inert diluent employed for ease of handling of the initiator components.

A better understanding of the invention will be obtained upon reference to the accompanying drawings. FIGURE 1 shows schematically a preferred embodiment of the invention in which propylene is polymerized in the presence of hydrogen and a catalyst system of diethylaluminum chloride and a titanium trichloride complex, the reaction being effected in liquid propylene as the reaction medium. FIGURE 2 illustrates an alternative control system for regulating the addition of hydrogen to the same reaction zone as shown in FIGURE 1.

Referring now to FIGURE 1, I have shown a reactor 10 provided with a donut tray 11 having a capped chimney positioned in the upper or vapor portion of the reactor. Within reactor 10 is a liquid phase 12 and a vapor phase 13 separated by interface 14. The space above donut tray 11 is reflux section 15 and contains falling propylene drops. The lower reaction section of the reactor contains a liquid body of boiling propylene. The reactor is preferably an upright cylindrical shell having a length to diameter ratio in the range of about 1:1 to 10:1. Fresh propylene monomer (which can contain dissolved hydrogen) is introduced into reactor 10 through conduit 16 and the catalyst components are introduced into the body of liquid propylene through conduits 17 and 18. Preferably, the catalyst components are introduced separately as shown, for example, the titanium trichloride complex can be introduced as a slurry in liquid propylene, which forms a part of the feed material, and the diethylaluminum chloride can be introduced as a solution in a hydrocarbon such as normal decane. Since a relatively small amount of catalyst is employed on a weight basis, very little of the normal decane solvent is required. In addition to any fresh propylene which is introduced with the catalyst, other fresh propylene (e.g. vapor stream of propylene and hydrogen removed overhead from reactor 10) can be introduced directly into the liquid body of boiling propylene in the reaction section as required to maintain the desired throughput (residence time) in the reactor.

Solid polypropylene product is removed from reactor 10 through drawoff leg 19. If desired, propylene can be introduced into the bottom of drawoff leg 19 to wash active catalyst residue and propylene soluble polymer from the particulate polypropylene product back into the bottom of reactor 10. The liquid level in the reactor is maintained constant by liquid level controller 20 which can use any level sensing device such as a float or a dielectric probe. Liquid level controller 20 is operatively connected to control valve 21 in polypropylene product stream conduit 22 so that flow from the reactor is increased or decreased as necessary to maintain vapor-liquid interface 14 at a constant level. If desired, product removal valve 21 can be operated in a continuous manner, i.e., partially open for the most part, or in a discontinuous manner, i.e., cycled from fully open to fully closed at the frequency required by controller 20 to maintain a constant level.

The polymerization reaction is exothermic and the heat of reaction is removed by vaporizing some of the propylene from the liquid body in reaction section 12. Vapors leaving the boiling body of liquid propylene, the upper level of which is shown in the drawing as interface 14 pass upwardly through vapor phase 13 through the capped chimney of donut tray 11 into reflux section 15 and are there contacted by droplets of subcooled propylene introduced through spray 24, which is fed by conduit 25. Propylene vapor condensed in reflux section 15 is collected on donut tray 11, a portion of which is removed from reactor 10 by way of conduit 26, passed through pump 27 and then through cooler 28 wherein the liquid propylene is subcooled, and then this subcooled condensed propylene is returned to reflux section 15 by way of conduit 25 and spray 24.

The remainder of the condensed propylene descending in reflux section 15 and collected in tray 11 overflows tray 11 via the chimney or via one or several downcomers (not shown) dipping below liquid surface 14 or via small "weep" holes in the bottom of tray 11.

The flow of subcooled propylene through conduit 25 is controlled by valve 29 which is actuated by flow recorder controller 30 in response to the flow measurement as determined by flow sensing element 31. The flow of heat exchange fluid through conduit 34 is controlled by valve 32 responsive to temperature recorder controller 33 which senses the temperature of subcooled propylene in the effluent from cooler 28. The rate of heat-of-reaction removal from reflux section 15 is controlled by temperature recorder controller 35 connected to temperature sensing element 36 in contact with liquid phase 12 by manipulating the set points of flow recorder controller 30 and/or temperature recorder controller 33 responsive to reaction temperature, thereby adjusting subcooled propylene flow rate and/or temperature.

The propylene-hydrogen vapor stream which is not condensed in reflux section 15 is removed overhead from the top of reflux section 15 through conduit 38 and is passed through blower or compressor 39 and then through conduit 40 and introduced into the bottom of reactor 10 by means of sparger 41.

Makeup hydrogen is introduced into the system by way of line 42. According to the invention, the rate at which fresh hydrogen is introduced into reaction section 12 of reactor 10 is controlled responsive to hydrogen concentration within the reactor. Hydrogen concentration is determined, in one embodiment, by sensing the pressure in the vapor phase section of the reactor by means of pressure recorder controller 43. Pressure controller 43 controls the position of valve 44 in hydrogen feed conduit 42 responsive to the vapor pressure of reactor liquid phase 12, thereby regulating the flow of hydrogen to the reactor in compensation for changes of pressure (or hydrogen concentration) within the vapor phase of the reactor.

In an alternative embodiment, FIGURE 2 illustrates a differential pressure control system for regulating the addition of fresh hydrogen to the system. A sealed bulb or cell 45 containing pure propylene (or a propylene-hydrogen mixture of known concentration) is inserted in liquid phase 12 of reactor 10. Thereby, the reference liquid in bulb 45 will be at the same temperature as the surrounding liquid. The vapor pressure exerted by the reference liquid in bulb 45 and the vapor pressure of the reactor liquid phase 12 are each transmitted to differential vapor pressure measuring device 46 by lines 49 and 48 respectively. A pneumatic signal representative of the difference in these two vapor pressures is transmitted to differential vapor pressure recorder controller 47 which, in cooperation with the desired value of differential pressure (controller 47 set point), produces a pneumatic signal which operates valve 44 to produce the flow rate of hydrogen to the reactor which brings about the desired concentration of hydrogen in liquid reaction phase 12. Thus, the rate of flow of fresh hydrogen into the system is controlled by the difference in pressure between the vapor phase of the reactor and the vapor pressure of pure propylene at the same temperature as the reactor liquid phase. In this manner, the influence of small variations in reactor pressure produced by the usual small variations in reactor temperature are eliminated, and a more precise control of hydrogen concentration is achieved which results in more consistent properties of the polypropylene produced in line 22. If desired, the reference liquid in bulb 45 can be pure propylene, or it can consist of a known concentration of hydrogen in propylene, the relationship of differential pressure to hydrogen concentration being introduced by calibration of transmitter 46 and by the set point of controller 47.

In order to illustrate further the method of my invention, the following example is presented. The conditions and proportions presented in the example are meant to be typical only and should not be construed to limit my invention unduly.

Liquid propylene is contacted with a catalyst of diethylaluminum chloride and a titanium trichloride complex in a vertically elongated reaction zone 5 feet in diameter and 25 feet in length at a temperature of 110° F. and a pressure of 255 p.s.i.g. Fresh propylene and catalyst are introduced continuously into the boiling liquid propylene in the reaction section of reactor 10. Vapors rising from the boiling liquid propylene are passed upwardly through donut tray 11 and contacted in section 15 with subcooled liquid propylene at a temperature of 80° F. being sprayed downwardly by spray 24. Condensed propylene at a temperature of 109° F. is removed from tray 11, passed through cooler 28 wherein it is cooled to 80° F. and then returned to the reactor by way of spray header 24.

A propylene-hydrogen vapor stream is withdrawn overhead and recirculated to the bottom of reaction section 12 through conduits 38 and 40. The polymer solids are withdrawn continuously from the bottom of the reactor through settling leg 19. Fresh hydrogen is introduced into the system through conduit 42 responsive to the pressure in the vapor phase of reactor 10. The hydrogen concentration in liquid phase 12 is maintained at 0.15 mol percent.

Since each hydrogen concentration in reactor 10 corresponds to a certain differential pressure between the vapor pressure of pure propylene in bulb 45 and the vapor pressure of reactor liquid phase 12, if the hydrogen concentration decreases below 0.15 mol percent, the differential pressure also decreases. This decreased pressure difference is sensed by differential pressure recorder controller 47. Controller 47 in response to this differential pressure and in cooperation with the set point, adjusts the flow of fresh hydrogen into the reactor by opening valve 44, thereby increasing the flow of hydrogen until the desired concentration (thereby the desired differential vapor pressure) in reactor 10 is reached. By manipulating the rate at which hydrogen is introduced into the reactor responsive to differential vapor pressure, as defined, so as to hold the hydrogen concentration at a constant value, it is possible to maintain uniform properties of the polypropylene product.

While the invention has been described in connection with present preferred embodiments thereof it is to be understood that this description is illustrative only and is not intended to be unduly limitative of the invention. As will be apparent to those skilled in the art, various modifications can be made in my invention without departing from the spirit and scope thereof.

I claim:
1. In a process for polymerizing propylene by contacting organometallic catalyst with a body of boiling liquid propylene containing hydrogen in a reaction zone having a liquid phase and a vapor phase and to which polymerization catalyst, propylene, and hydrogen are fed continuously into said liquid phase, and particulate polymer solids are withdrawn from said zone, the improvement which comprises removing heat of reaction from said zone by contacting said vapor with subcooled liquid propylene cooler than said vapor to condense propylene therefrom, withdrawing said condensed propylene from said zone, subcooling said condensed propylene, returning said condensed and subcooled propylene to said zone as said subcooled liquid, withdrawing propylene vapor and hydrogen from said vapor space and circulating same to said body of boiling propylene thereby agitating same.

2. A process according to claim 1 wherein the rate at which heat of reaction is removed is controlled responsive to the temperature of the liquid phase of said zone.

3. A process for polymerizing propylene which comprises contacting a catalyst of diethylaluminum chloride and titanium trichloride with a body of boiling liquid propylene containing from 0.03 to 0.40 mol percent hydrogen in a reaction zone having a liquid phase and a vapor phase, passing vapor from said body of boiling propylene upwardly through a spray of subcooled liquid propylene cooler than said vapor in a reflux zone in said vapor phase to condense propylene therefrom, withdrawing condensed propylene from said reflux section, subcooling same and returning only said subcooled propylene as said spray, withdrawing vapor from above said spray and circulating said vapor to the bottom of said reaction zone, dispersing said circulated vapor in the lower portion of said body of liquid propylene thereby agitating same, measuring the temperature of said liquid phase and controlling the temperature of said subcooled propylene responsive to said measured temperature, detecting the differential pressure between the vapor pressure of an enclosed sample of pure propylene submerged in said liquid phase and the vapor pressure of said liquid phase, producing a control signal as a function of said differential pressure, and controlling the addition of hydrogen to said zone responsive to changes in said signal so as to maintain said hydrogen concentration within said predetermined mol percent limits.

4. A reactor and control system suitable for propylene polymerization comprising, in combination, an elongated substantially vertical vessel having a lower liquid reaction section and an upper vapor phase and reflux section, means for introducing catalyst, hydrogen and propylene monomer into said reaction section, a donut tray having a capped chimney positioned above the liquid level in the reaction section of said vessel, vapor-liquid contacting means positioned above said tray in said reflux section, means for circulating condensed liquid from said tray through a cooler and then to said contacting means, means for withdrawing polymer solids from the bottom of said reaction section, a control valve in said hydrogen feed means, and a pressure controller operatively connected to said vessel and said valve, thereby enabling control of hydrogen concentration in said reaction section by varying hydrogen addition rate.

5. The apparatus of claim 4 wherein said pressure controller is a differential pressure controller operatively connected through a transmitter to a cell containing pure propylene disposed below the liquid level in said vessel and to the vapor space of said vessel so as to be responsive to the difference in pressure between said cell and said vessel.

6. A reactor and control system suitable for propylene polymerization comprising, in combination, an elongated substantially cylindrical vessel having a lower reaction section and an upper vapor phase and reflux section, feed conduit means for separately introducing catalyst, hydrogen and propylene monomer into the reaction section of said vessel, a donut tray having a capped chimney disposed above the liquid level within said vessel, said tray and the top of said vessel defining said reflux section, spray means in the top of said vessel adapted to spray liquid downwardly into said reflux section in contact with vapor therein, conduit means for circulating vapor from the top of said reflux section to the bottom of said reaction section, means for withdrawing polymer solids from the bottom of said vessel, conduit means for withdrawing condensed liquid collected on said tray and circulating said condensed liquid through an external cooler and back to said spray means, a temperature sensing device in said reaction section, a temperature controller operatively connected to said device, said cooler being operatively connected to said temperature controller responsive to temperature changes, a control valve in said hydrogen feed means, and a pressure controller operatively connected to said vessel and said control valve, thereby enabling control of hydrogen concentration in said reaction section by varying hydrogen addition rate.

7. The apparatus of claim 6 wherein said pressure controller is a differential pressure controller operatively connected to a cell containing pure propylene disposed below the liquid level in said vessel and the vapor space of said vessel so as to be responsive to the difference in pressure between said cell and said vessel.

References Cited by the Examiner

UNITED STATES PATENTS

| | | | |
|---|---|---|---|
| 2,484,384 | 10/1949 | Levine et al. | 260—683.15 |
| 2,885,389 | 5/1959 | Schappert | 260—94 |
| 2,909,410 | 10/1959 | Fedorko | 23—209 |
| 2,926,074 | 2/1960 | Berger | 23—263 |
| 2,964,511 | 12/1960 | Cottle | 260—94.9 |
| 3,002,961 | 10/1961 | Kirschner | 260—93.7 |
| 3,051,690 | 8/1962 | Vandenberg | 260—88.2 |
| 3,126,365 | 3/1964 | Hooker | 260—94.9 |

JOSEPH L. SCHOFER, *Primary Examiner.*

F. L. DENSON, *Assistant Examiner.*